(12) United States Patent
Chapman et al.

(10) Patent No.: US 10,020,754 B2
(45) Date of Patent: Jul. 10, 2018

(54) STRING INVERTER SYSTEM

(71) Applicant: SunPower Corporation, San Jose, CA (US)

(72) Inventors: Patrick L. Chapman, Austin, TX (US); Zachary Judkins, Berkeley, CA (US); Jacob Marshall, Lafayette, CA (US)

(73) Assignee: SunPower Corporation, San Jose, CA (US)

( * ) Notice: Subject to any disclaimer, the term of this patent is extended or adjusted under 35 U.S.C. 154(b) by 0 days.

(21) Appl. No.: 15/389,667

(22) Filed: Dec. 23, 2016

(65) Prior Publication Data

US 2018/0097452 A1   Apr. 5, 2018

Related U.S. Application Data

(60) Provisional application No. 62/402,644, filed on Sep. 30, 2016.

(51) Int. Cl.
| | |
|---|---|
| *H02M 3/24* | (2006.01) |
| *H02M 7/42* | (2006.01) |
| *H02S 40/32* | (2014.01) |
| *H02M 1/00* | (2006.01) |

(52) U.S. Cl.
CPC ............. *H02M 7/42* (2013.01); *H02S 40/32* (2014.12); *H02M 2001/0003* (2013.01); *H02M 2001/0067* (2013.01)

(58) Field of Classification Search
CPC ............ H02J 3/38; H02M 7/48; Y02E 10/563
See application file for complete search history.

(56) References Cited

U.S. PATENT DOCUMENTS

2009/0160259 A1* 6/2009 Naiknaware ........ H02M 7/4807
307/82

FOREIGN PATENT DOCUMENTS

CN   203368361 U   12/2013

OTHER PUBLICATIONS

El Bassiouny, et al, Energy-Efficient Cost-Effective Inverter Configuration for Residential Photovoltaic Systems, University of Illinois at Urbana-Champaign, Urbana, IL; University of Texas at Arlington, Arlington, TX; SolarBridge Technologies, Champaign, IL; 978-1-4244-5892-9/10/$26.00 © 2010 IEEE; pp. 000400-000406.
http://tenksolar.com/products/moduleinverter/#inverter; Ten K Solar Product Offerings; Ten K Solar, 9231 Penn Ave South, Suite 100, Minneapolis, MN 55431, info@tenksolar.com.

* cited by examiner

*Primary Examiner* — Adolf Berhane
*Assistant Examiner* — Afework Demisse
(74) *Attorney, Agent, or Firm* — GRASSO PLLC

(57) ABSTRACT

A multi-inverter system with at least a string of inverters sharing a DC bus and outputting to a shared AC bus. Inverters are hot-swappable and configured to be turned on or off during powered cycles. Central control may comprise reducing power point tracking redundancies or promoting other operational changes at individual inverters of a group.

20 Claims, 10 Drawing Sheets

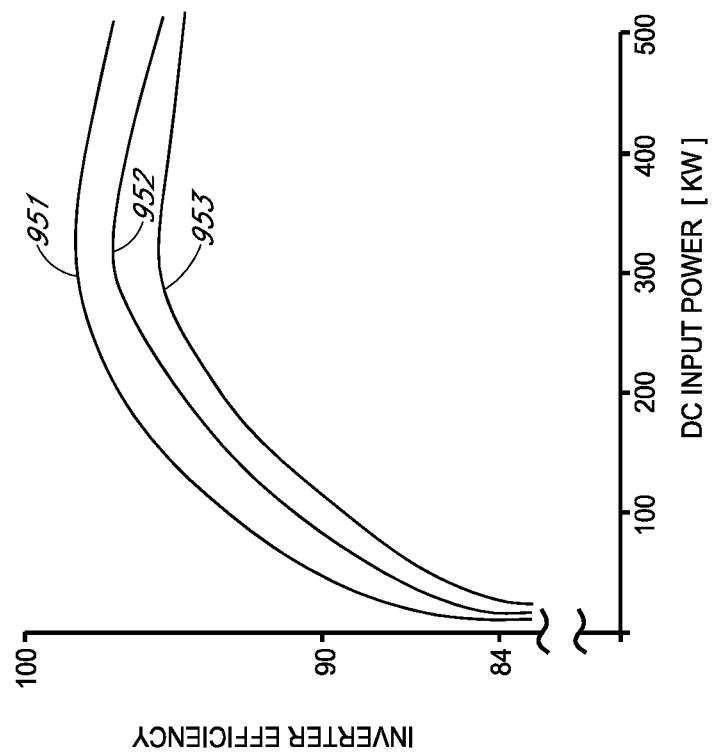
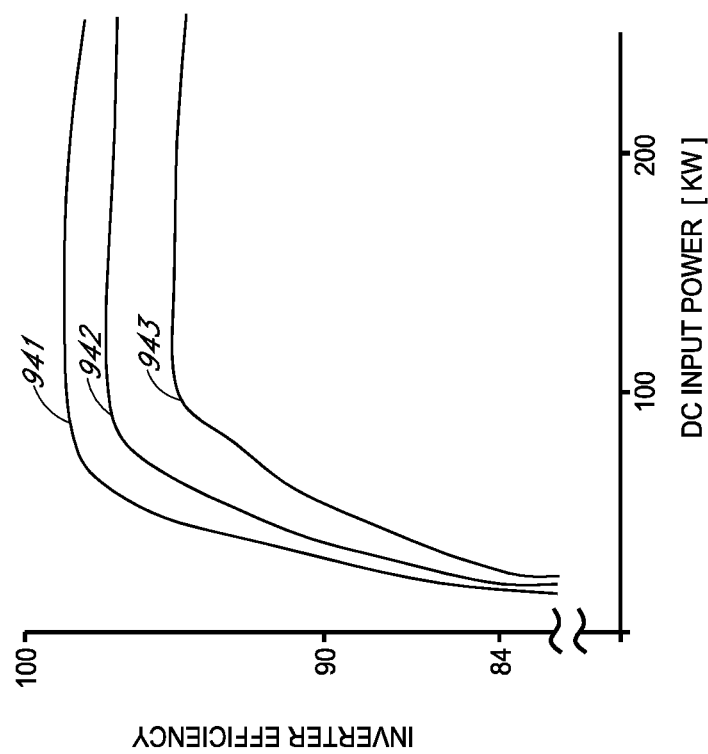
FIG. 9C
FIG. 9D

STRING INVERTER SYSTEM

CROSS-REFERENCE TO COMMONLY OWNED APPLICATION

The present application is related to, claims the benefit of, and claims priority under 35 U.S.C. § 119 to U.S. provisional patent application 62/402,644, which was filed on Sep. 30, 2016, and is entitled String Inverter System. The contents of the '644 application are incorporated herein by reference in their entirety.

BACKGROUND

Photovoltaic (PV) cells, commonly known as solar cells, are devices for conversion of solar radiation into electrical energy. Generally, solar radiation impinging on the surface of, and entering into, the substrate of a solar cell creates electron and hole pairs in the bulk of the substrate. The electron and hole pairs migrate to p-doped and n-doped regions in the substrate, thereby creating a voltage differential between the doped regions. The doped regions are connected to the conductive regions on the solar cell to direct an electrical current from the cell to an external circuit. When PV cells are combined in an array such as a PV module, the electrical energy collected from all of the PV cells can be combined in series and parallel arrangements to provide power with a certain voltage and current.

Voltage and current can be processed by local inverters situated at each PV module or other DC source and by central inverters that receive voltage and current from several PV modules or other plurality of DC sources. These inverters use principles of varying magnetic and electric fields to convert a DC voltage and current from a PV cell of the PV module or other DC source to an AC voltage and current for downstream application. The voltage generated by the DC source and changed to VAC by a central inverter or grouping of local micro-inverters may then be output to the local consumer at the solar array or other installation site as well as to the electric power grid if surplus power is available.

BRIEF DESCRIPTION OF THE DRAWINGS

FIGS. 9A-9D illustrate exemplary efficiency graphs for inverters as may be activated/deactivates or coupled/decoupled according to some embodiments.

DETAILED DESCRIPTION

Figure 1:
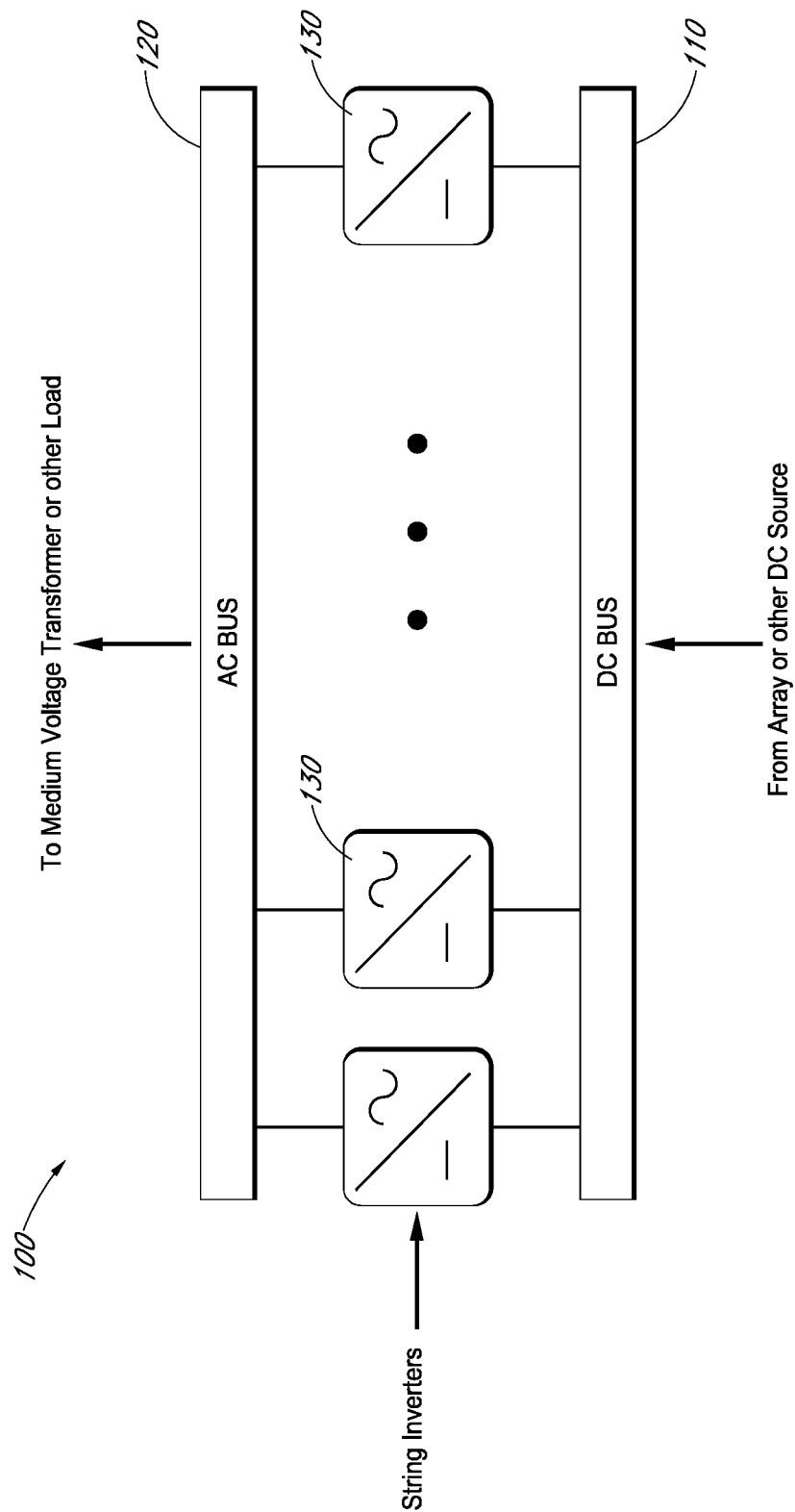
FIG. 1 illustrates a string inverter system, according to some embodiments.

The following detailed description is merely illustrative in nature and is not intended to limit the embodiments of the subject matter of the application or uses of such embodiments. As used herein, the word "exemplary" and its variables means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

This specification includes references to "one embodiment" or "an embodiment." The appearances of the phrases "in one embodiment" or "in an embodiment" and their variables do not necessarily refer to the same embodiment. Particular features, structures, or characteristics may be combined in any suitable manner consistent with this disclosure.

TERMINOLOGY

The following paragraphs provide definitions and/or context for terms found in this disclosure (including the appended claims):

"Comprising." This term is open-ended. As used in the appended claims, this term does not foreclose additional structure or steps.

"Configured To." Various units or components may be described or claimed as "configured to" perform a task or tasks. In such contexts, "configured to" is used to connote structure by indicating that the units/components include structure that performs those task or tasks during operation. As such, the unit/component can be said to be configured to perform the task even when the specified unit/component is not currently operational (e.g., is not on/active). Reciting that a unit/circuit/component is "configured to" perform one or more tasks is expressly intended not to invoke 35 U.S.C. § 112, sixth paragraph, for that unit/component.

"First," "Second," etc. As used herein, these terms are used as labels for nouns that they precede, and do not imply any type of ordering (e.g., spatial, temporal, logical, etc.). For example, reference to a "first" inverter or first controller does not necessarily imply that this inverter or controller is the first inverter or controller in a sequence; instead the term "first" is used to differentiate an inverter, controller, or other component or feature or step from another inverter, controller, or other feature or step (e.g., a "controller").

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

"Coupled"—The following description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically.

"Inhibit"—As used herein, inhibit is used to describe a reducing or minimizing effect. When a component or feature is described as inhibiting an action, motion, or condition it may completely prevent the result or outcome or future state completely. Additionally, "inhibit" can also refer to a reduction or lessening of the outcome, performance, and/or effect which might otherwise occur. Accordingly, when a component, element, or feature is referred to as inhibiting a result or state, it need not completely prevent or eliminate the result or state.

In addition, certain terminology may also be used in the following description for the purpose of reference only, and thus are not intended to be limiting. For example, terms such as "upper", "lower", "above", and "below" refer to directions in the drawings to which reference is made. Terms such as "front", "back", "rear", "side", "outboard", and "inboard" describe the orientation and/or location of portions of the component within a consistent but arbitrary frame of reference which is made clear by reference to the text and the associated drawings describing the component under discussion. Such terminology may include the words specifically mentioned above, derivatives thereof, and words of similar import.

In the following description, numerous specific details are set forth, such as specific operations, in order to provide a thorough understanding of embodiments of the present disclosure. It will be apparent to one skilled in the art that embodiments of the present disclosure may be practiced without these specific details. In other instances, well-known techniques are not described in detail in order to not unnecessarily obscure embodiments of the present disclosure.

This specification first describes an exemplary configuration of modular inverters and then describes potential operation of that system. These introductions are followed by a more detailed explanation of various embodiments of inverter systems and operation thereof. Various examples are provided throughout. These examples are not exclusive from each other, and may, instead be combined in various other ways, with, for example, fewer or more features disclosed herein as well as features not explicitly identified herein.

Embodiments may include a string of multiple inverters as well as processes for operating such a system. The inverters in this system may be aligned in a single string configuration as well as in a multiple string configurations. The inverters may be hot pluggable such that connectors employed allow an inverter to be inserted into the system or removed from the system while a DC bus or busses supplying voltage to a rack of the system is energized, in operation and providing a voltage to be converted to AC voltage. Embodiments may also provide for selective activation and deactivation of already present inverters to promote system efficiency, longevity of inverters, and for other reasons as well.

In embodiments with multiple inverters sharing the same DC bus and AC bus, the inputs and outputs may remain energized when the inverter is removed from the rack or other connection configuration. In embodiments, technicians making a swap, addition, or removal, may not be exposed to hazardous voltages and associated flash potential. Likewise, in embodiments technicians may not need to pull "hot work" permits as arcing and other hazards may be reduced.

Multiple inverter systems and their mounting racks configured for multiple inverters may be managed at a central station near the rack as well as remote from the rack and the system itself. The management functions may be performed by a rack controller separate from the inverters in the system as well as by a controller in one or more of the inverters in the rack. The control of the operation of the multiple inverters may be performed at other locations as well. In embodiments, the inverters may share the same topology but may have unique topologies as well. The controller may preferably account for these differences when managing the operation of the inverter system. The multiple inverters may be powered off of a single DC bus as well as multiple DC busses in one or more racks at the inverter system. The inverters will preferably output AC voltages to the same AC bus at the system. This AC bus may be connected to a load, such as a transformer or a home or a power grid and, preferably, without the use or necessity of a distribution panel.

The variability and scalability of embodiments, through the use of various combinations of inverters, can provide for suitable matching of power outputs in small increments through the ready addition and removal of inverters in a DC-AC conversion system. Still further, inverters may be independently controlled and independently activated and deactivated, an effect of which can be to improve overall conversion efficiency. During this activation and deactivation as well as when inverters are physically hot plugged and physically removed, inverters can be managed to operate at peak efficiency, for example at a peak efficiency on their individual power curves and, if not plausible, to be shut off or removed, etc. In so doing, inverters may be designed and configured with a higher peak efficiency, which may be available in a smaller operational band, with less or no regard for efficiencies at other power levels because of the ability to bring online and offline other inverters depending upon power conditions experienced at the time.

Other provisions may also include managing mechanical trackers or other systems that have served to limit the distribution of PV module power to utility scale applications or otherwise add additional unwanted capacity (and attributable cost) to DC-AC conversion systems. In embodiments, the combined string or strings of inverters may be sized and configured for applications unsuitable for central inverters. Accordingly, the flexibility of design of using multiple inverters can provide scalable AC outputs suitable for utility transformer applications or other applications. Furthermore, a multiple inverter configuration can provide scalable AC outputs different than the AC outputs available from a central inverter.

In embodiments, DC voltage may be aggregated from PV modules, windmills, or other DC source unto a common DC bus. Many inverters may be coupled to the bus to convert the DC voltages to AC voltages. These inverters, once coupled to the bus, may be operated using a single maximum power point determined by a controller of the system, in the rack of the inverters, in an inverter, or at another location. Thus, once an inverter is plugged into the rack and connected to a shared DC bus, any local inverter power point functionality may be disabled and the specific inverter may operate using power points set outside of the inverter. Similarly, other redundant functionality of the inverter may be disabled or rendered inactive as that particular function is taken over or otherwise handled by a central controller, which may be informed or aware of system wide performance and environmental impacts. Also, in embodiments having a common DC bus architecture, energy storage and other additional auxiliary loads can be added, either processing power from batteries to the grid or reverse power from the grid to charge batters or run any additional equipment such as meteorological stations.

Depending upon load requirements or for other reasons, some inverters of the system may be inactive. Similarly, inverter redundancy may also be provided by the system, where inverters may be paired or otherwise associated and if an active inverter of the pair is disabled an inactive inverter in the pair may be activated. Such redundancy may be preferred in applications having high DC power production and/or applications having meaningful costs or consequences if output power is not delivered. For example, a backup power supply for a hospital using PV power may be an installation where redundancy of power conversion is preferred.

Similarly, in embodiments, inverters may be activated and deactivated for designated periods of time. This cycling may be load and power independent and the cycling may be provided to extend the durability and life of inverters by sharing the workload across many inverters. For example, in a string of ten inverters operating at 30% capacity for the system, four inverters may be operated near 100% power while six are dormant and the active four may be changed over time such that each inverter shares similar loads and active/inactive times. When inverters are sized differently, this ability to activate and deactivate inverters can allow tailoring of the active inverters to more closely mimic the imposed power demands. For example, inverters with 30 kW and 50 kW outputs can be activated and deactivated or added and removed to meet 130 kW load, which could not be precisely met by an exclusive grouping of either rated inverter. In so doing, the durability of a system may be extended, the time between periodic maintenance may be lengthened, and the efficiency of the system may be improved.

Accordingly, in embodiments, a controller can cycle through different inverters in a set such that the same inverters are not always running and in so doing, the reliability of each of the inverters can be extended. For example, when the average power output of an inverter is within 30% of its rating, some inverters may be deactivated and others may be operated near or at 100% of its power output rating or some other ideal operating set point.

Following from the addition and removal of inverters, and the selective activation and deactivation, efficiency versus power curves for the inverters may be tailored to selective activation/deactivation and removal/addition scenarios. For example, inverters in the system may be configured with different optimum points in the power versus efficiency curve as well as multiple different optimum points. Then, depending on system conditions, specific inverters, best suited for the system conditions at the time, may be brought online or offline and/or added and subtracted from the system to offer a preferred or the best conversion ratio for the system as whole or a portion of the system.

In embodiments, a shared DC bus architecture may use a system of module inverters to provide flexibility in optimizing system design using string or modular inverters. When considering DC/AC ratio, closer matching in outputs may be provided through scalability of inverter additions or removals to match DC sources and AC demands. For large output strings of PV panels, e.g. those generating 1500V DC, large under-utilization of inverters may develop in order to meet the DC voltage supply and the AC demand. By sharing a DC bus amongst multiple inverters, embodiments can create flexibility in the accommodation of input DC power or other provided DC power while maintaining preferred DC/AC ratios for the inverter system. For example, a string of 25 performance series PV panels may be rated at ~8.6 kW. If an inverter with a nameplate capacity of 100 kW were used, approximately 8.6% of the inverter's capacity would be employed. This inverter may be the only choice that also satisfies the DC/AC ratio required between the input and output. Thus, using large centralized inverters can allow changes in increments of 8.6%. Comparatively, through addition or deletion of smaller modular inverters in a modular system, as in embodiments, adjustments of smaller percentages, e.g. 1%, 2%, 0.5%, 5%, etc. as to DC/AC ratio, capacity or other metric may be made.

Also, in embodiments, one or more inverters may be connected to an AC bus but not a DC bus. Such embodiments may support system topologies where strictly reactive power inverters are employed to accommodate plant reactive needs and other grid interconnection requirements. Such designs can allow the inverters in the system that are responsible for DC/AC conversion to be cost reduced by not sizing components internally for both active and reactive needs.

As noted, control for the inverters may be located at various locations. When an inverter is plugged into the bus and mounted on a rack of the system, the inverter may enter a reduced activity mode where its operation is partly controlled by another component. For example, as noted above, power point tracking for an inverter may be de-activated when the inverter is mounted in a rack of the system. For another, AC feedback may also be deactivated as a central controller may provide instructions for switch control or other operation after considering system or specific bus attributes. Controllers may employ hard wired circuit ASICs as well as programmable microcontrollers and other configurations, and combinations thereof, for purposes of monitoring and controlling operations, as well as for other purposes. Embodiments may employ a central controller apart from an inverter and may also employ a primary/secondary controller topology where one controller of an array of inverters serves as a primary system controller and the other controllers in the remaining inverters serve as secondary or back-up controllers.

The external configuration of an inverter along with the location of several hot pluggable bus bar connectors may allow an inverter, in embodiments, to be hot swapped into and out of an inverter rack and, likewise, coupled and decoupled from an energized DC bus and an active AC bus. Thus, as shown below in FIG. 5, an inverter may be configured with connectors on one end and may be sized such that it may be connected and unconnected from the AC and DC busses much like a breaker is coupled to a bus in a breaker box. The voltages for these busses can reach into the thousands of DC volts, e.g., 1,000V, 1500V, etc., and into the hundreds for AC volts, e.g., 400 VAC, 600 VAC, etc. Thus, by configuring the inverter with handling portions opposite of the connection side and its connectors, an inverter may be hot swapped into or out of a rack by an operator. Hot swapping additions may support system operational increases, where additional inverter capacity may provide for higher operational efficiencies. Hot swapping may also provide for system maintenance where an inverter is no longer functioning or functioning below its operational specifications. Similarly, if a system upgrade is desired, more efficient inverters, for example, may be hot swapped and brought online in replacement for or in addition to existing inverters in an operational system.

Communication between the inverters and any controller may occur using wire line and wireless techniques. The wired techniques include power line communication and the wireless methods include Wi-Fi, Bluetooth, and other wireless protocols. When an inverter is connected to a system it may send an introduction message to the central controller. The message may include the identity of the controller, its operational parameters, its location, its connections, and other operational data as well. In response, the controller may send confirmation of receipt as well as operating parameters for the inverter to use. Other instructions that may be sent include dormancy periods, activity periods, power requirements, clock-timing confirmations, and system status. When a controller observes that an inverter is operating outside of a variance for that inverter, the controller may send updated operating instructions to the inverter to bring the inverter back to within a predetermined tolerance. For example, if observed zero-voltage crossing perturbances are too large, the controller may send new switch timing instructions to the inverter to smooth out unwanted perturbances. Likewise, if peak output voltages are not high enough, the controller may send instructions to modify pulse width modulation (PWM) switch signaling in an inverter, or may provide other solutions as well, for execution by the inverter. Similar sensing and adjustment instructions may be provided for other examples of voltage drift.

As noted above, a central controller may be located in one of the inverters, may be periodically shifted between inverters, and may also be located in another location, apart from any one inverter. At start up, and periodically, a controller may ping each inverter for a status and may send revised operating instructions for each inverter to keep the system operating in a target range. Upon receiving confirmations and status reports from one or more inverters, the controller may activate/deactivate one or more controllers, make adjustments to some, and perform other modifications to optimize system wide performance. When outputs or other performance issues arise a controller may be configured to send alerts to an outside manager seeking additional maintenance or instructions for the system.

Isolation between inverters may be provided by using multiple DC busses to provide aggregate DC power. Inverters may be grouped into two or more strings, with each string fed by a different DC bus so that each string may be isolated from the inverters on the other strings. Isolation of DC busses may be intended to allow for separate maximum power points (MPPTs) in the power block the system is servicing. In some applications, one DC bus and therefore one MPPT may be all that is needed but due to layout or panel differences the power block may benefit from two Maximum Power Points (MPPTS) and therefore the DC bus may be broken into two to accommodate different DC operating points. This break up in DC bus could be executed in steps up to the number of actual inverters in the system.

Also, these different DC busses may be fed by different DC sources, e.g., different arrays of PV modules. For example, a two-dimensional array of PV modules may have each string of PV modules in the array feed a different DC bus. In so doing, the DC bus voltages may differ significantly for the different strings of inverters of the same system. Upon seeing such a disparity in available DC to each string of inverters, the controller may make adjustments for each string rather than the system as a whole. For example, the power point may be varied for each of the strings of inverters. Also, one string of inverters may have several inverters deactivated while the other string remains at full operation.

Topologies employing embodiments may reduce the number of AC and DC fuses used for the strings of inverters. In embodiments, rather than have a fuse for each inverter, larger fuses may be employed for all of the inverters of a string as well as for the entire inverter rack of an inverter system.

A controller in embodiments may also be apprised of weather events or other timely operational factors and make adjustments to inverter operation accordingly: shutting down unneeded inverters; and modifying outputs including output voltages and output frequencies. Similarly, hard fault detection may also be managed by a controller and system adjustments or other adjustments be made. In such examples, a controller may deactivate one or more inverters on sensing a hard fault as well as change breaker settings or make other adjustments of the inverter system resulting from the hard fault detection or other sensed event.

Turning now to FIG. 1, label 100 points to a schematic showing features of an inverter system as may be employed in embodiments. As depicted, an AC bus 120 and DC bus 110 run parallel to each other and are spanned by a plurality of inverters 130. This string of inverters 130 may serve to convert DC voltage on the DC bus and deliver AC voltage to the AC bus. This AC voltage may then be sent to a medium voltage transformer or other load. The inverters 130 may be hot swapped and coupled or decoupled from between the AC bus 12 and the DC bus 110. The inverters 130 may also be activated and deactivated periodically, in concordance with line demands, in concordance with operating efficiencies, for testing, and for other reasons as well. In some embodiments, the variability and configurability of the one or more strings of inverters may provide more efficient or more reliable outcomes than available central inverter topologies because of, for example, the scalability of adding and subtracting inverters and the ability to operate inverters more closely to their individual peak operating points.

Figure 2:
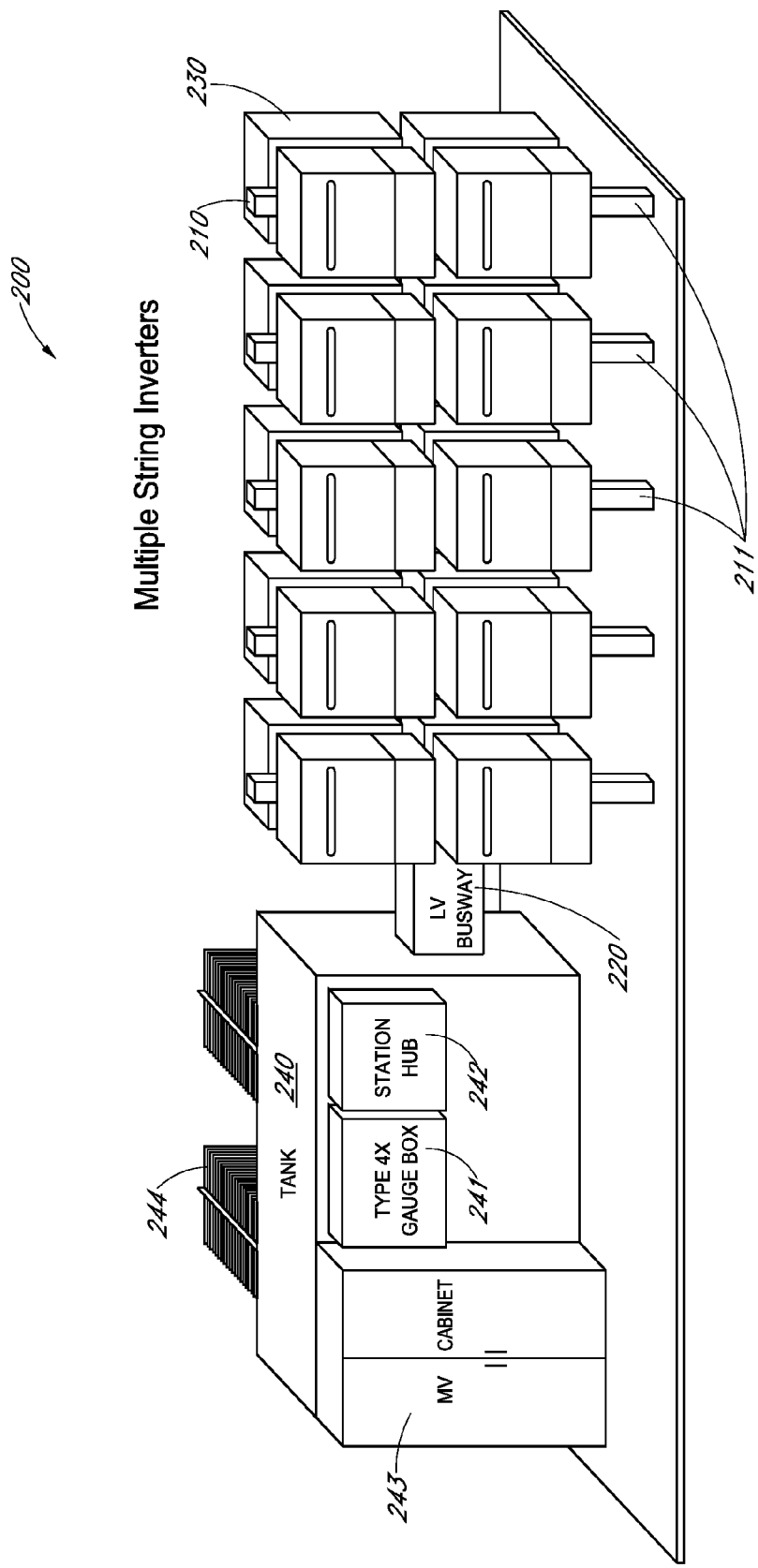
FIG. 2 illustrates a multiple string inverter system feeding a medium voltage transformer, according to some embodiments.

Turning now to FIG. 2, multiple string inverters are shown at 200, with each of the multiple strings coupled to upper vertical busses 210 and lower vertical busses 211. The string inverters 230 are shown outputting to low voltage busway 200 and then to the tank 240 of the transformer. This transformer is also shown with a controller cabinet 243, gauge box 241, system hub 242, and cooling fins 244. Thus, embodiments may provide power to medium voltage transformers or other electrical grid components. The inverters 230 may be physically plugged and unplugged from the supports 210 and 211 for the various reasons discussed herein. Similarly, once coupled they may be activated and deactivated in the various operational patterns described herein.

Figure 3:
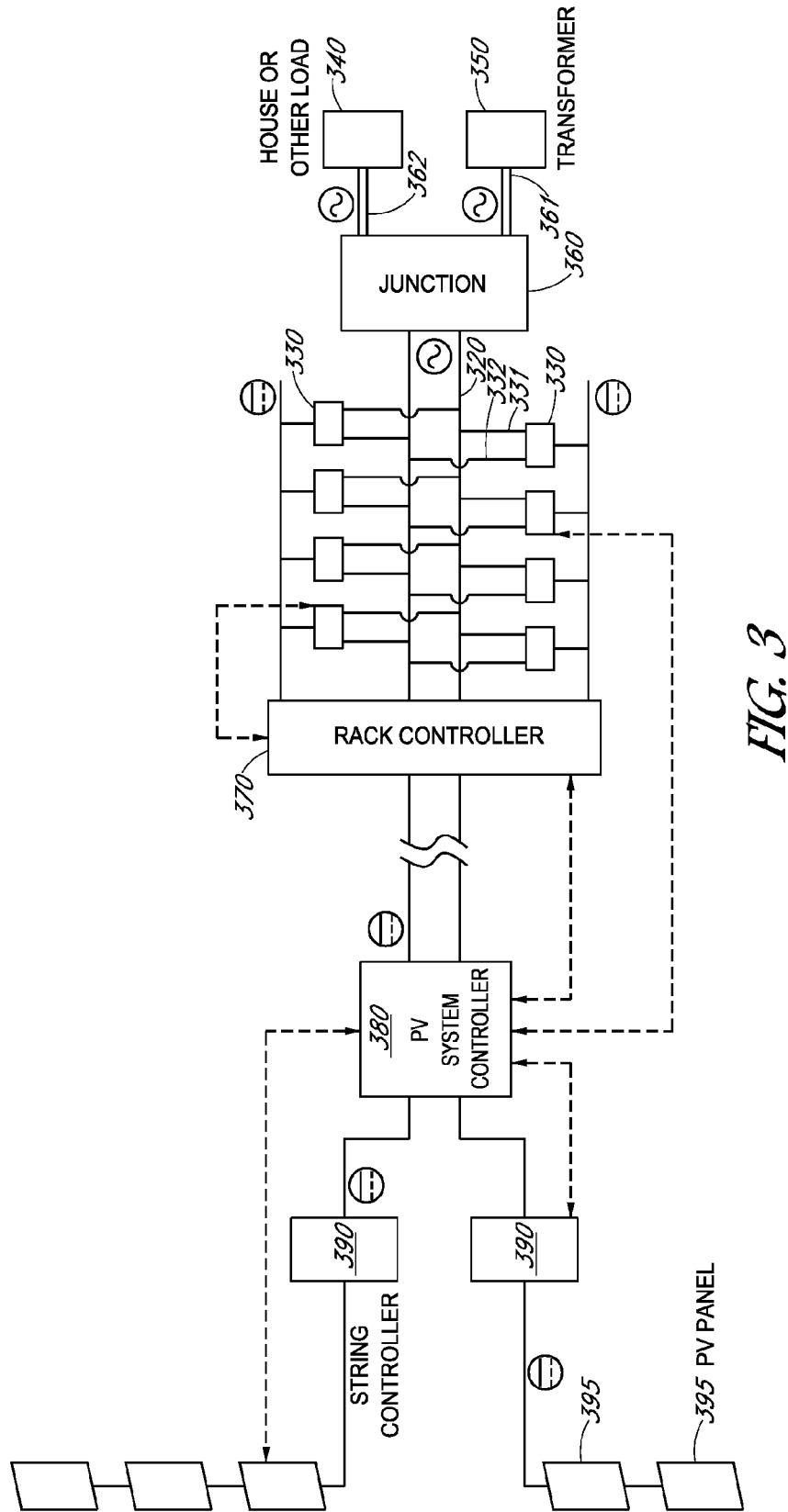
FIG. 3 illustrates a PV module system using a multiple string inverter system to feed power to a transformer, house, or other load, according to some embodiments.

FIG. 3 illustrates a PV module system 300 connected to a multiple string inverter system as may be employed in embodiments. Labeled in FIG. 3 are PV panels 395, PV string controllers 390, PV system controller 380, rack controller 370, inverters 330, junction 360, junction outputs 361 and 362, transformer 350, load 340, AC bus 320, and AC outputs 331 and 332. Dashed lines in FIG. 3 denote communication paths while solid lines show DC or AC power flow. As can be seen, rack controller 370 may receive feedback from and communicate with inverters 330 as well as the PV system controller 380. And, this system controller 380 may receive feedback from and communicate with the inverters 330 and the string controllers 390. Thus, power management and system control may be carried out among and between the controller 380 and the controller 370 in embodiments. Power management and system control may be carried out in other fashions as well. For example, as mentioned above, one or more controllers from inverters 330 may provide some or all of the system management for the inverter rack and this control may be passed from inverter 330 to inverter 330 over time as well. Controllers in the inverters 330 may also provide redundancy or overflow services for the rack controller 370. Still other installation and management topologies are also possible.

Figure 4:
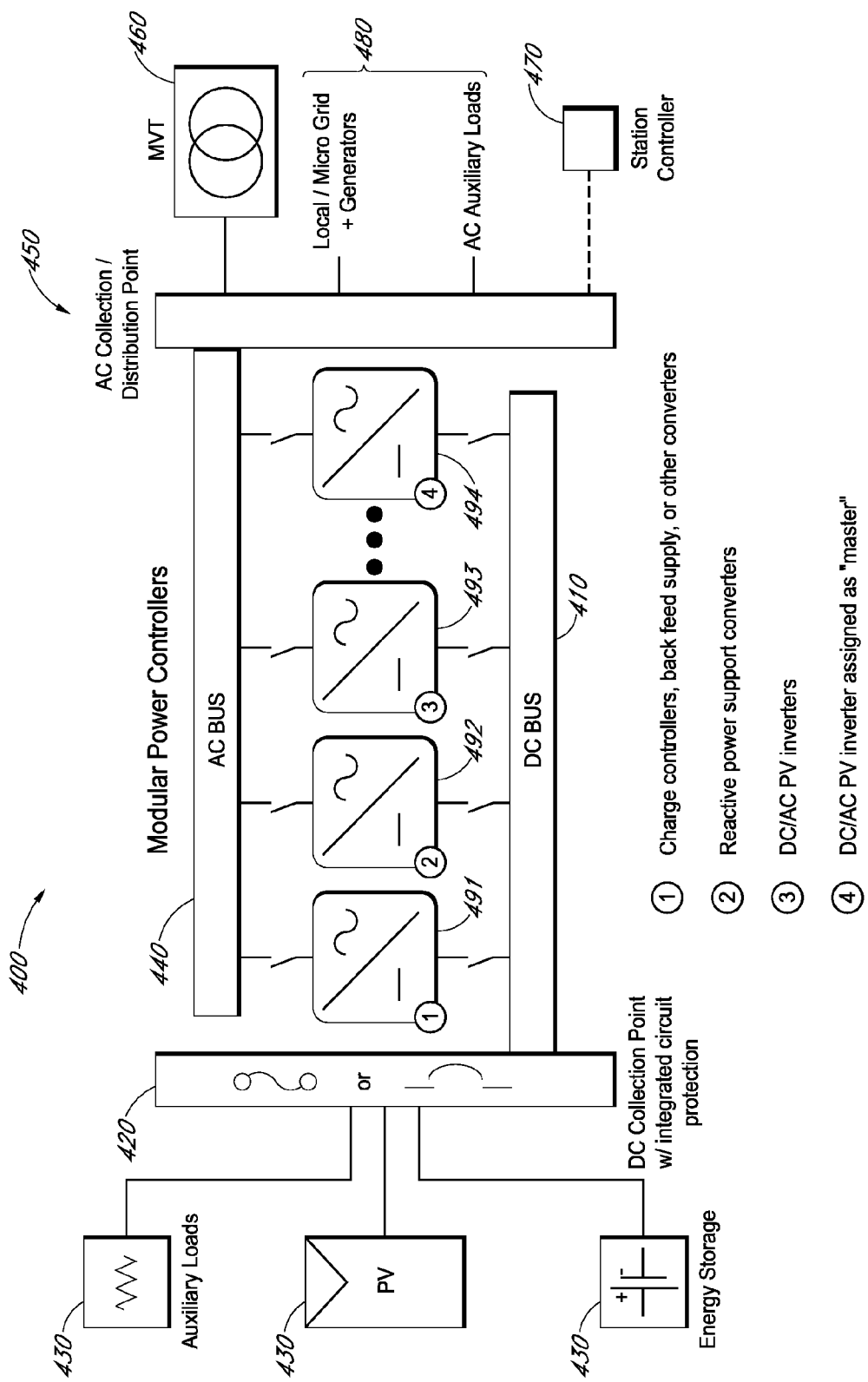
FIG. 4 illustrates a multiple string inverter system with exemplary source and exemplary load, according to some embodiments.

FIG. 4 illustrates a schematic of a multiple inverter system as may be employed in embodiments. In FIG. 4 the DC bus 410 is shown receiving power from a distribution point 420 that has several upstream components 430 attached to it. These loads, PV panels, and battery may interrelate to each other without the need to send power through the distribution point 420 to the DC bus. In other words, in low output periods the PV panels may power the auxiliary loads and charge the battery while having little to no power remaining for distribution to the DC bus. When power is received at the DC bus, the parallel inverters can serve to convert VDC to VAC and distribute this VAC to the AC bus for receipt at a collection point 450. This collection point 450 may then serve a utility transformer, such as a medium voltage transformer and a station controller 470. Control modules may also be present to monitor the AC collection and distribution from the AC bus. The station controller 470 may be in communication with the MVT 460, the inverters 491-494, the PV panels, the auxiliary loads, and other components feeding power into the system, converting the power or taking the power from the system. The AC distribution may also serve to feed local grids 480, micro-grids 480, generators 480, and AC auxiliary loads 480. Integrated DC circuit protection at the DC collection point is also shown along with disconnect mechanisms on either side of the inverters. These disconnects (420 and 450) may assist in the hot swap features of embodiments.

As shown in FIG. 4, the inverters 491-494 may have different configurations and provide different services to the system 400. Charge control and back feed supply may be provided by one or more inverters while others may provide for reactive power support, specific PV voltage conversion, and primary control or conversion duties.

Figure 5:
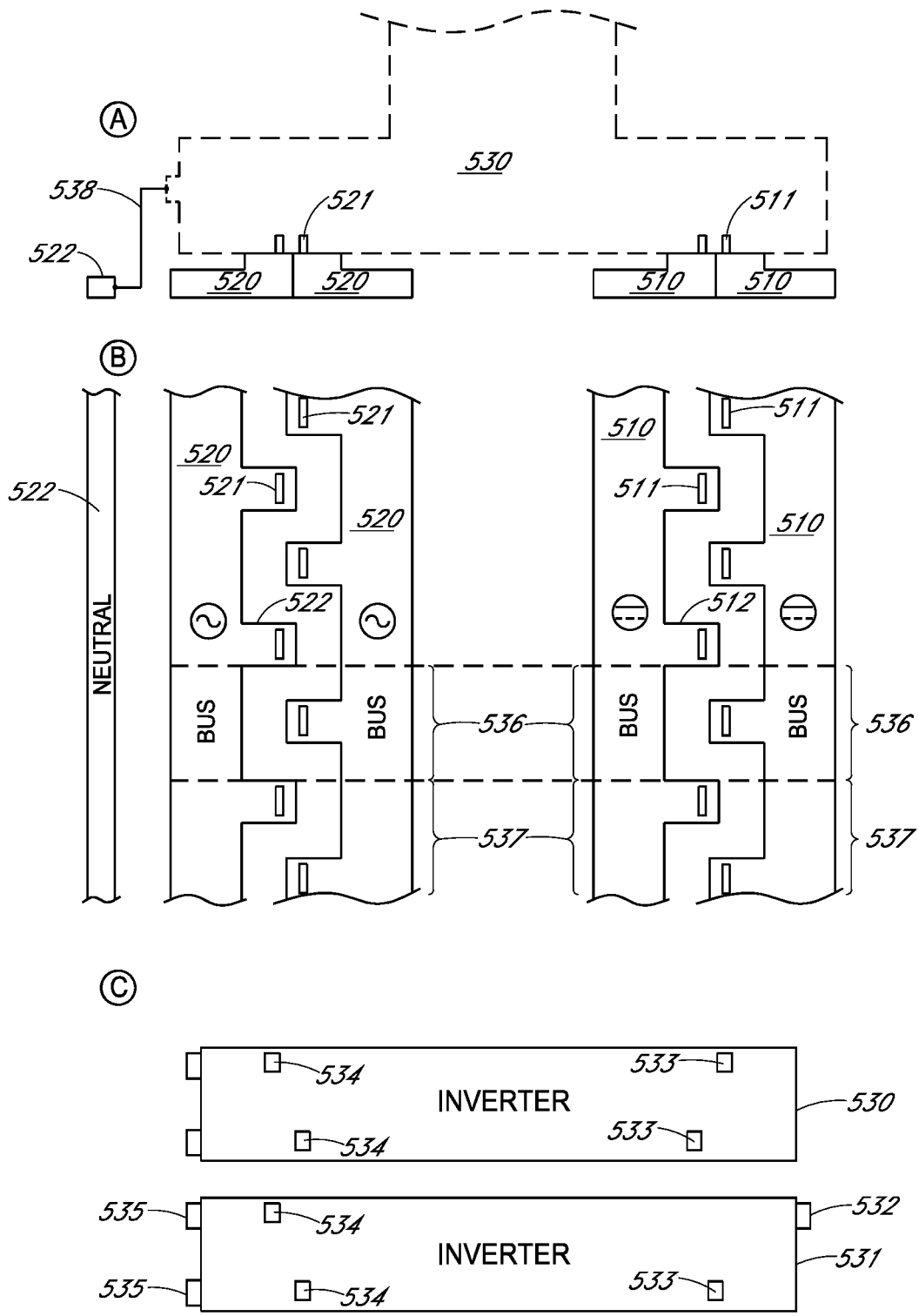
FIG. 5 illustrates features of inverters and busses as may be employed in a multiple string inverter systems, according to some embodiments.

FIG. 5 illustrates features of an AC bus 520, DC busses 510, and inverters 530 and 531 as may be employed in embodiments. Labeled in FIG. 5 are hot pluggable connectors 533 and 534, external neutral connectors 535, ground connectors 530 and 532, neutral bar 522, bus tabs 522 and 512, and bus connectors 511. View B of FIG. 5 shows a flat view of sections of two DC busses and one AC bus as may be employed in embodiments. View A shows a side elevation of view B with a ghost line as to where an inverter may be coupled to the bus bars. View A also shows how neutral 522 can be connected to inverter 530 via line 538. View C shows a connection end of inverters as may be employed in embodiments. The inverters of View C may be snapped or otherwise secured into buses 510 and 520 as shown in areas 536 and 537 of View B.

In use, inverters 530 and 531 may be hot swapped into and out of the busses 510 and 520 depending upon operational conditions, including loads, voltage supplies and operating characteristics of the inverters themselves. Likewise, once coupled, the inverters may be activated and deactivated as described herein and for other reasons as well. The bus bars 510 and 520 are shown to be able to accommodate more than two inverters. As some bus bar sections may be exposed, exterior protective casings or shieldings may be preferably provided for protection from the possible 400 or more VDC or VAC of the operational buses.

In embodiments, to provide further protections, breakers may be employed at one or more of the busses to temporarily disconnect power from one or more of the busses when a hot swap is to occur. These breakers may be tripped when voltages exceed a threshold, such as 600 VDC and may not be tripped in lower voltage swaps, such as at 240 VDC or below. These voltage levels and the use of the breakers may change depending upon the installation location, the expected training of the technician performing the swap, and other factors as well.

Figure 6:
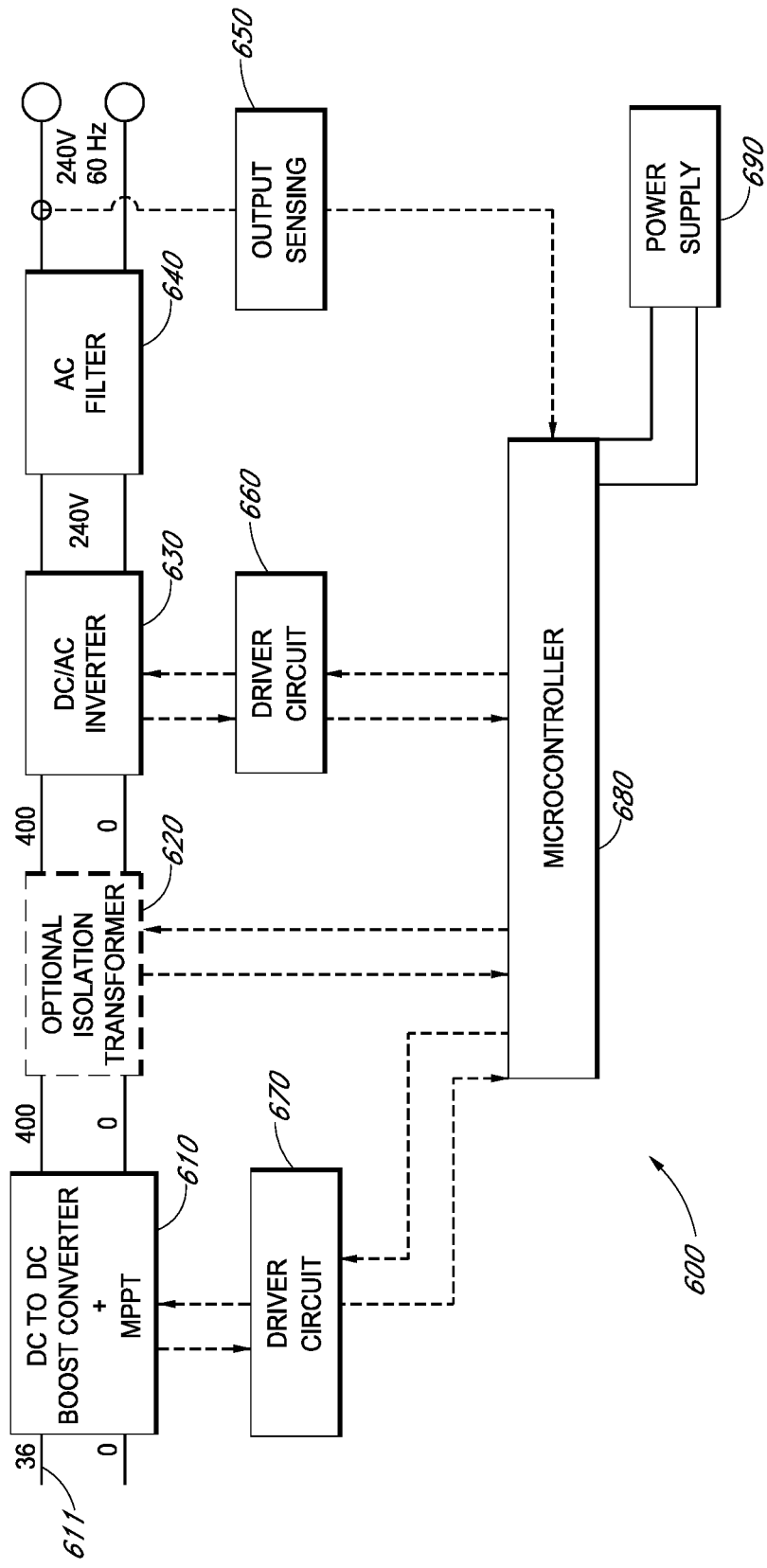
FIG. 6 illustrates a block diagram showing topology of an inverter, according to some embodiments.

Turning now to FIG. 6, a block diagram of an inverter as may be employed in embodiments is provided. Labeled in FIG. 6 are a boost converter 610, an optional isolation transformer 620, an inverter 630, an output filter 640, driver circuit 670, driver circuit 660, output sensor 650, microcontroller 630, and power supply 690. Communications are designated by dashed lines while power exchange is designated with solid lines with the isolation transformer also being dashed because it may be optional.

In operation, a DC source may provide a DC voltage input 611 to the inverter 600. This input voltage 611 may be stepped up in voltage by a boost converter 610 or may be passed directly to the inverter 630 or through an isolation transformer 620 before reaching the inverter 630. The inverter 630 may contain a topology with pairs of switches such that when the switches are fired in an alternating order, input DC voltage is converted to a cyclical AC output voltage. This AC output voltage may be further conditioned in AC filter 640. As can be seen, the inverter serves to change the dc input voltage of 400 volts to a mean ac voltage of 240 volts. These voltages may be different in different embodiments, as may the topology of the inverter 600 itself.

In embodiments, when a microcontroller 680 or other controller, determines that additional input voltage is being provided, that an inverter is not operating in a peak range, that another inverter has been added to the system, and for various other reasons, including those described herein, the microcontroller 680 or other controller may modify the functionality of the inverter 600 and may also send control signals to other inverters in the system. Thus, the microcontroller or other controller may serve as a local controller for the inverter 600 and for the system as whole.

Figure 7:
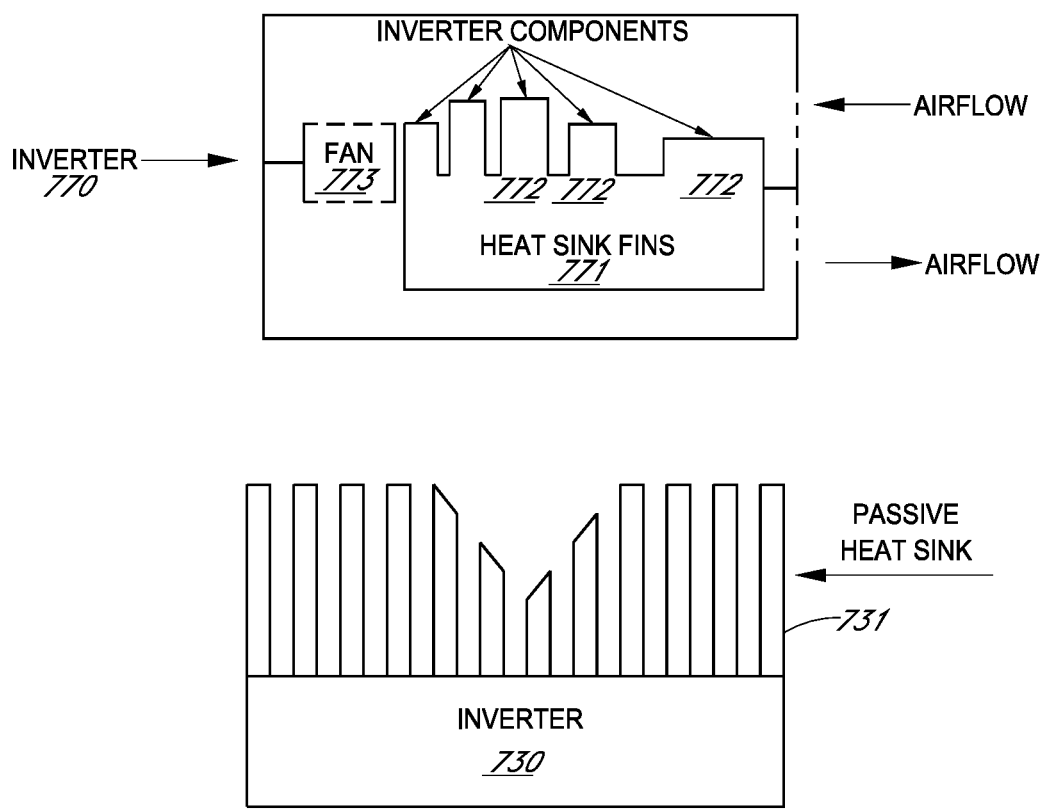
FIG. 7 illustrates cooling features of inverters as may be employed, according to some embodiments.

FIG. 7 shows enclosures and heat dissipation mechanisms that may be employed in embodiments. Inverter 770 is shown with an active heat sink employing a fan 773, which serves to draw air into the inverter and force air out for cooling purposes. Inverter 730 is shown with a passive heat sink 731, which relies on conduction and convection of heat to transport heat away from the inverter 730. In use, the active heat dissipation systems may be controlled and managed in conjunction with the operation of the inverter. During periods of activity, active heat dissipation systems may be active until internal temperatures reach target levels, regardless of whether or not the inverter is operational. Active heat dissipation systems may also be controlled such that they pause during hot swapping or at other times and for other reasons as well. Moreover, even when an inverter is deactivated, its active heat dissipation systems may, nonetheless, be activated.

Figure 8:
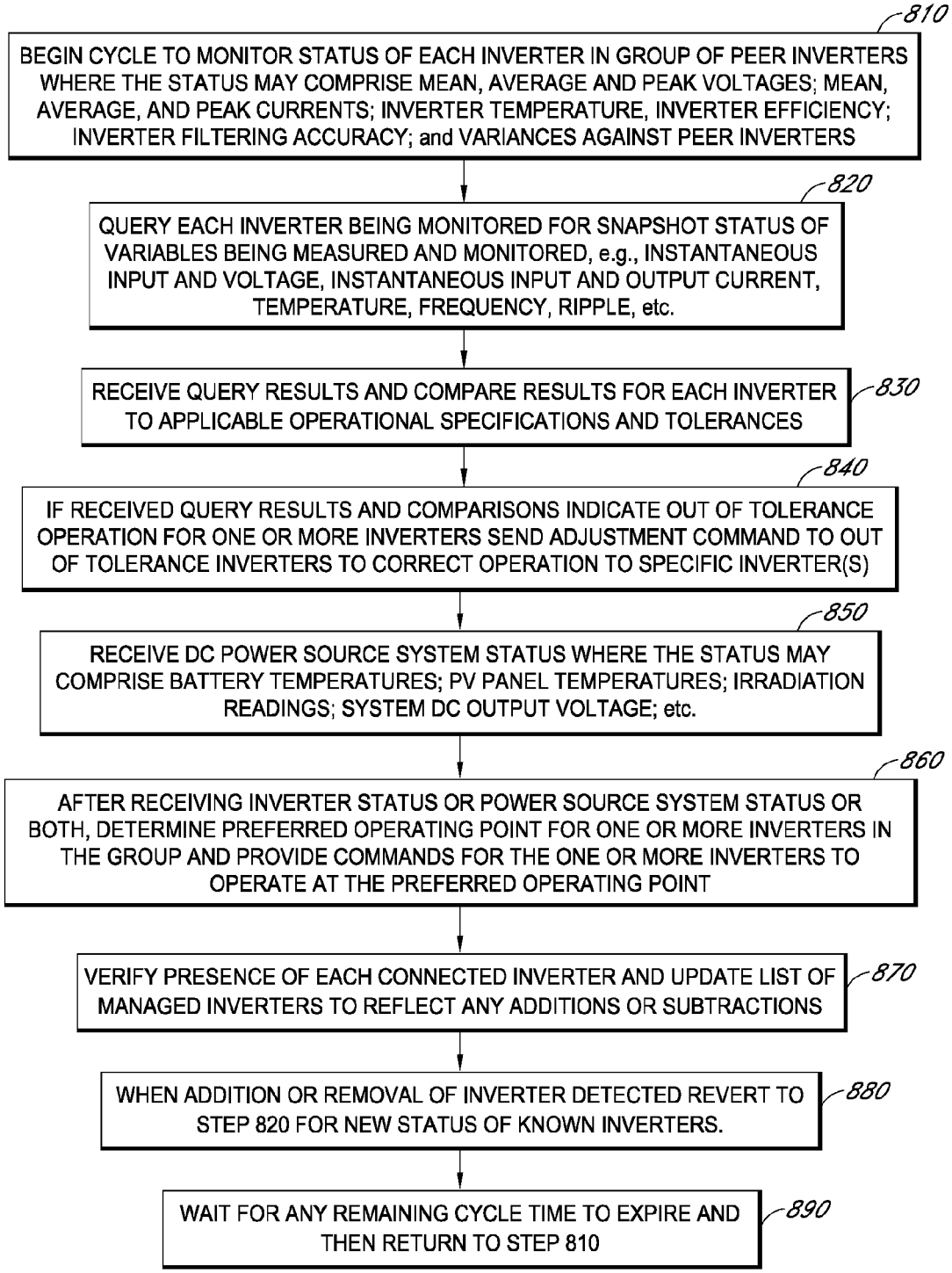
FIG. 8 illustrates a flow chart of control parameters for a multiple string inverter system as may be employed, according to some embodiments.

FIG. 8 shows process steps that may be employed in embodiments. This process may include system monitoring and system management and may be carried out at one or more of the controllers shown herein as well as at other locations. Box 810 describes that monitoring cycles may include monitoring the status of one or more inverters in a group of peer inverters where the monitored metrics may comprise mean, average and peak voltages; mean, average, and peak currents; inverter temperature, inverter efficiency; inverter filtering accuracy; and variances against peer inverters. These metrics may be used for activating/deactivating inverters or other components and for the coupling and decoupling of inverters or other components. Box 820 describes how queries may be made of one or more inverters being monitored for snapshot status of variables being measured and monitored, e.g., instantaneous input and voltage, instantaneous input and output current, temperature, frequency, ripple, etc.

Box 830 describes how query results may be received and compared for each inverter as well as the system as a whole and subsystems as well, against applicable operational specifications and tolerances. If received query results and comparison indicate out of tolerance operation for one or more inverters, adjustment commands may be sent to out of tolerance inverters to correct operation to specific inverter(s) at shown at 840. Activation and deactivation commands may also be sent. As shown at 850 DC power source system status may also be received, where the status may comprise battery temperatures; PV panel temperatures; irradiation readings; system DC output voltage; etc. After receiving inverter status or power source system status or both, as shown at 860, a determination of a preferred operating point for one or more inverters in the group may be made and commands provided for one or more inverters to operate at the preferred operating point.

There are still more processes that may also occur. As shown at 870, the presence of each connected inverter may be verified and a list may be updated to reflect any additions or subtractions and when an addition or removal of an inverter detected reversion to step 820 may occur to determine the status of all known inverters. Delay may also be introduced, as shown at 890, as waiting may occur for any remaining cycle time to expire and then return to step 810.

Processes of embodiments may also employ designating a primary inverter per group of bussed conversion devices that may control the operating point of that bus and may assign power set points to others throughout operation in order to keep the system at its optimal point. An inverter that is deemed primary can be rotated at a fixed frequency to spread out runtime or maintain system functionality in the event the inverter considered the primary is faulted. In embodiments, a primary may engage any additional devices such as reactive power support inverters and the primary may be responsible for aggregating any alarms and pertinent system data to advertise to external controllers or SCADA systems.

Figure 9A:
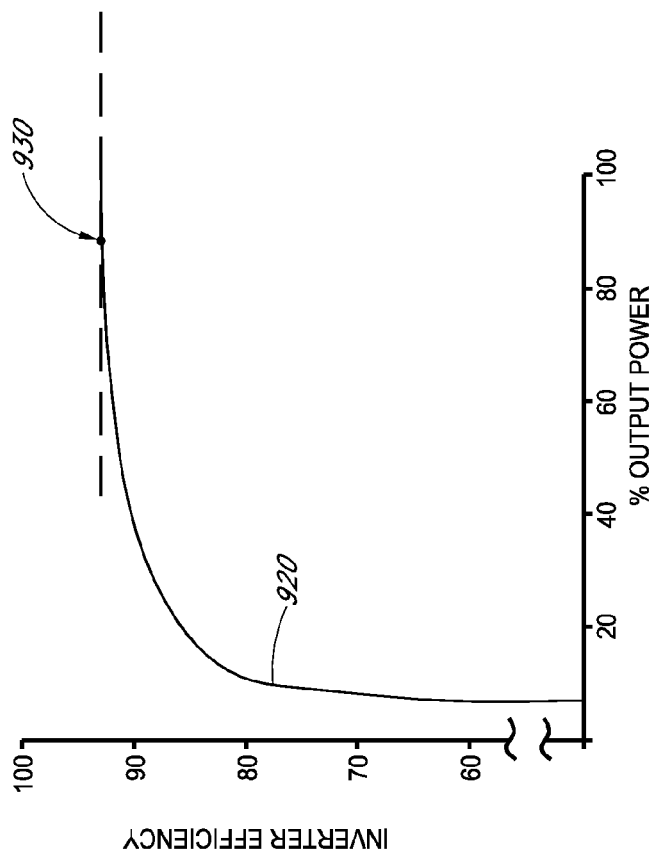
Figure 9B:
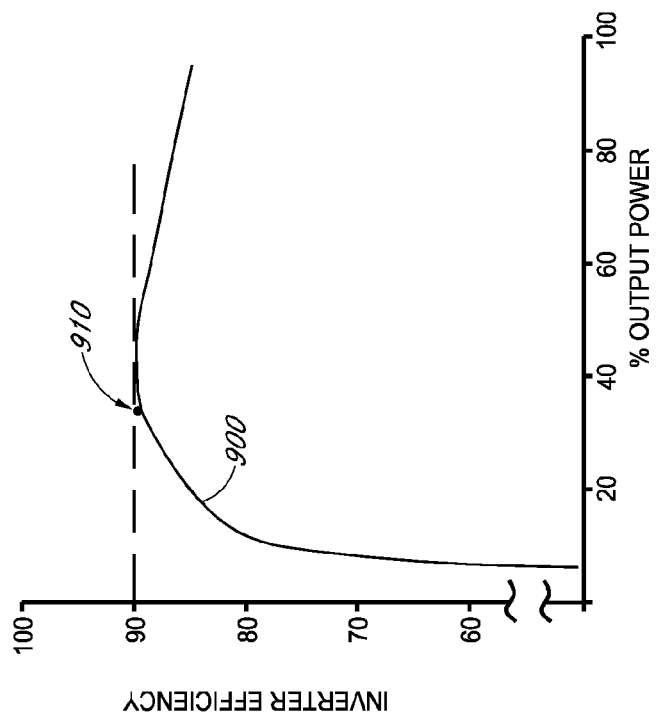

FIGS. 9A-9D illustrate exemplary inverter efficiency versus output power graphs or DC input power graphs for inverters as may be activated/deactivated or coupled/decoupled according to some embodiments. FIGS. 9A and 9B show inverter efficiency versus output power for different inverters. As can be seen, the max efficiency occurs at different points for these two graphs, and the associated underlying inverters. In FIG. 9A, the peak efficiency 910 occurs between 30% and 40% of output power. Comparatively, in FIG. 9B the peak efficiency occurs between 90% and 100% of output power.

In FIG. 9C, DC input power for three voltages is shown versus inverter efficiency. As can be seen, the peak 941, 942, 943, for each of three voltages occurs as a different point and at a different efficiency rating. Similarly, FIG. 9D, which reflects the same comparison as in FIG. 9C, but for a different inverter, these performance graphs are different. So, here too, inverters may be coupled/decoupled or activated/deactivated as described herein depending upon the output power status and seeking peak efficiency as a system and for each individual inverter.

Thus, in embodiments, inverters may be coupled/decoupled or activated/deactivated as described herein depending upon the output power status and when seeking peak efficiency as a system and for each individual inverter. In other words, as output power rises different inverters, each having efficiency curves suitable towards higher power outputs, may be brought online or added while other inverters with less suitable power curves may be deactivated or decoupled. Similarly, as DC input power changes, inverters with efficiency curves more suitable towards the new input power may be brought online or added while other inverters with less suitable input power curves may be deactivated or decoupled. For example, the inverter of FIG. 9A may be active or installed when output power is near 40% of the inverter max power rating and the inverter of FIG. 9B may not be in use or installed. And, inverter of FIG. 9B may be activated or installed when output power is around 93% while the inverter of FIG. 9A may not be in use or installed. In another example, the inverter of FIG. 9C may be active or installed when input power is near 100 kW and the inverter of FIG. 9D may not be in use or installed. And, inverter of FIG. 9D may be activated or installed when input power is around 300 kW while the inverter of FIG. 9C may not be in use or installed.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An inverter system comprising:
    a plurality of inverters, each inverter of the plurality of inverters comprising an internal controller;
    a DC bus coupled to each of the inverters;
    an AC bus coupled to each of the inverters;
    a system controller, the system controller configured to perform tracking functionality for two or more of the inverters and to send tracking instructions to two or more inverters for receipt and use by those two or more inverters; and
    an AC output configured to output at least 120 VAC (or more) for receipt by a transformer,
        wherein each of the inverters of the plurality are configured to be manually coupled to and configured to be manually uncoupled from the AC bus.

2. The inverter system of claim 1 wherein inverters of the plurality further comprise hot-pluggable connectors and wherein each of the inverters of the plurality are configured to be manually coupled to and manually uncoupled from the DC bus.

3. The inverter system of claim 1
wherein the tracking functionality is maximum power point tracking,
wherein the DC bus is receiving voltage from a PV source, and
wherein the transformer is a utility transformer.

4. The inverter system of claim 1 wherein the system contains an electro-mechanical rack configured to support inverters of the plurality and configured to couple inverters of the plurality to the DC and AC busses.

5. The inverter system of claim 1 wherein a first inverter and a second inverter of the plurality of inverters are not located in the same inverter rack but are each connected to the DC bus and the AC bus.

6. The inverter system of claim 5 wherein the first inverter further comprises a hot-pluggable harness, the hot-pluggable harness connecting the first inverter to at least the AC bus or the DC bus.

7. A process of operating an inverter rack, the process comprising:
identifying that a first inverter has been added to a string of parallel inverters while the parallel inverters were active and coupled between a DC input bus and an AC output bus;
after identifying that the first inverter has been added to the string of parallel inverters, sending operating instructions to the first inverter, the operating instructions including instructions for an internal function of the first inverter to become inactive; and
monitoring operation of the first inverter and the other inverters of the string and sending corrective operating instructions to one or more inverters when voltage outputs exceed a target variance,
wherein the first inverter is configured to be manually coupled to the AC output bus and configured to be manually uncoupled from the AC output bus.

8. The process of claim 7 further comprising:
selecting between adding or activating another inverter or further burdening existing inverters to accommodate an increased power demand.

9. The process of claim 8 wherein power demand is spread across all of the inverters in the rack and the increase in power demand requires at least a 50% increase in output from at least one of the inverters in the rack.

10. The process of claim 7 wherein inverters of the plurality are brought into operation and taken out of operation to maintain a peak range of operating efficiency for one or more of the inverters in the rack.

11. The process of claim 10 wherein the peak range is within 5% of the peak efficiency of power conversion for the one or more inverters.

12. The process of claim 10 wherein the peak range is within 1% of the peak efficiency of power conversion for the one or more inverters.

13. The process of claim 7 wherein inverters of the plurality are brought into operation and taken out of operation in a repeating cycle such that over time each inverter of the string tends toward having an equivalent amount of operational time and nonoperational time as other inverters of the string.

14. The process of claim 7 further comprising activating one or more inverters in the string of parallel inverters, the one or more inverters in the string previously in a deactivated nonpower converting state.

15. The process of claim 7 further comprising activating an inverter and deactivating a different inverter, the activated inverter having a different efficiency versus output power curve than the deactivated inverter and wherein the first inverter is configured to be manually coupled to the DC input bus and configured to be manually uncoupled from the DC input bus.

16. The process of claim 7 further comprising activating an inverter and deactivating a different inverter, the activated inverter having a first operating efficiency at a first voltage and the deactivated inverter having a second operating efficiency at the first voltage, the second operating efficiency being lower than the first operating efficiency.

17. A system for converting DC voltage to AC voltage, the system comprising:
one or more DC busses receiving DC voltage from a DC power source;
an AC output bus providing AC power configured to reach a utility transformer;
two or more inverters coupled to both the AC bus and one or more DC busses;
wherein the two or more inverters are configured to be manually removed from the busses when the busses are energized or configured to be manually connected to the busses when the busses are energized or configured for both, and
wherein each of the inverters contains an internal controller and a heat dissipation sink.

18. The system of claim 17 wherein the DC voltage received is a constant DC input from a PV system performing maximum power point tracking to maintain the constant DC input.

19. The system of claim 18 further comprising a central controller, the central controller having maximum power point tracking functionality.

20. The system of claim 19 wherein the maximum power point tracking functionality is configured to be inactive when received DC voltage from the DC power source is maintained at a constant voltage by the DC power source and wherein there is no distribution panel between the AC bus and the utility transformer.

\* \* \* \* \*